United States Patent
Kang et al.

(10) Patent No.: US 12,322,377 B2
(45) Date of Patent: Jun. 3, 2025

(54) METHOD AND APPARATUS FOR DATA AUGMENTATION

(71) Applicant: ELECTRONICS AND TELECOMMUNICATIONS RESEARCH INSTITUTE, Daejeon (KR)

(72) Inventors: Byung-Ok Kang, Daejeon (KR); Jeon-Gue Park, Daejeon (KR); Hyung-Bae Jeon, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 377 days.

(21) Appl. No.: 17/856,377

(22) Filed: Jul. 1, 2022

(65) Prior Publication Data

US 2023/0009771 A1   Jan. 12, 2023

(30) Foreign Application Priority Data

Jul. 6, 2021   (KR) .......................... 10-2021-0088496

(51) Int. Cl.
*G10L 15/00* (2013.01)
*G10L 15/06* (2013.01)
(Continued)

(52) U.S. Cl.
CPC ............ *G10L 15/063* (2013.01); *G10L 15/16* (2013.01); *G10L 25/51* (2013.01); *G10L 2015/0635* (2013.01)

(58) Field of Classification Search
CPC ....... G10L 15/063; G10L 15/16; G10L 25/51; G10L 2015/0635; G10L 15/06; G10L 2015/0636; G10L 15/00; G10L 13/033; G10L 13/10; G10L 2013/105; G10L 13/0335; G10L 13/027; G10L 13/02;
(Continued)

(56) References Cited

U.S. PATENT DOCUMENTS 9,721,559 B2   8/2017   Cui et al.
10,387,765 B2 * 8/2019   Mailhe ................. G06N 3/02
(Continued)

FOREIGN PATENT DOCUMENTS

KR   10-2019-0106861 A   9/2019
KR   10-2020-0044337 A   4/2020
(Continued)

OTHER PUBLICATIONS

Hsu, Wei-Ning, Yu Zhang, and James Glass. "Unsupervised learning of disentangled and interpretable representations from sequential data," Advances in neural information processing systems 30 (2017) (Year: 2017).*
(Continued)

*Primary Examiner* — Edgar X Guerra-Erazo
(74) *Attorney, Agent, or Firm* — Rabin & Berdo, P.C.

(57) ABSTRACT

Disclosed herein is a method for data augmentation, which includes pretraining latent variables using first data corresponding to target speech and second data corresponding to general speech, training data augmentation parameters by receiving the first data and the second data as input, and augmenting target data using the first data and the second data through the pretrained latent variables and the trained parameters.

12 Claims, 6 Drawing Sheets

(51) Int. Cl.
*G10L 15/16* (2006.01)
*G10L 25/51* (2013.01)

(58) Field of Classification Search
CPC ..... G10L 15/07; G10L 15/065; G10L 15/075; G10L 15/083; G10L 15/1807; G10L 15/18; G10L 15/1815; G10L 15/187; G10L 17/18; G10L 25/27; G10L 25/30; G10L 25/69; G10L 25/54; G10L 25/60; G10L 25/75; G10L 25/84; G10L 25/81; G10L 2025/783; G10L 2025/786; G10L 2025/906; G10L 25/90; G06N 3/08; G06N 3/04; G06N 3/045; G06N 3/0455; G06N 3/0475; G06N 3/048; G06N 3/044; G06N 3/0442; G06N 3/0464; G06N 3/09; G06N 3/091; G06N 3/092; G06N 3/094; G06N 3/096; G06N 3/02

See application file for complete search history.

(56) References Cited

U.S. PATENT DOCUMENTS

| | | | | |
|---|---|---|---|---|
| 10,410,113 | B2* | 9/2019 | Clayton | G06N 3/045 |
| 10,565,758 | B2* | 2/2020 | Hadap | G06T 5/77 |
| 11,514,888 | B2* | 11/2022 | Finkelstein | G10L 17/18 |
| 11,830,476 | B1* | 11/2023 | Karanasou | G06N 3/0455 |
| 2019/0026631 | A1* | 1/2019 | Carr | G06N 3/084 |
| 2019/0304480 | A1 | 10/2019 | Narayanan et al. | |
| 2020/0034661 | A1 | 1/2020 | Kim et al. | |
| 2020/0151963 | A1 | 5/2020 | Lee et al. | |
| 2020/0335086 | A1* | 10/2020 | Paraskevopoulos | G10L 25/30 |
| 2021/0103721 | A1 | 4/2021 | Im et al. | |
| 2022/0101121 | A1* | 3/2022 | Vahdat | G06N 3/048 |
| 2023/0072255 | A1* | 3/2023 | Klein | G06N 3/0455 |
| 2023/0104417 | A1* | 4/2023 | Vechtomova | G10H 1/0008 704/9 |

FOREIGN PATENT DOCUMENTS

| | | |
|---|---|---|
| KR | 10-2020-0107389 A | 9/2020 |
| KR | 10-2158743 B1 | 9/2020 |
| KR | 20210036692 A | 4/2021 |
| KR | 20210041567 A | 4/2021 |

OTHER PUBLICATIONS

B. He, S. Wang, W. Yuan, J. Wang and M. Unoki, "Data Augmentation for Monaural Singing Voice Separation Based on Variational Autoencoder-Generative Adversarial Network," 2019 IEEE International Conference on Multimedia and Expo (ICME), Shanghai, China, 2019, pp. 1354-1359 (Year: 2019).*
X. Xia, R. Togneri, F. Sohel and D. Huang, "Auxiliary Classifier Generative Adversarial Network With Soft Labels in Imbalanced Acoustic Event Detection," in IEEE Transactions on Multimedia, vol. 21, No. 6, pp. 1359-1371, Jun. 2019. (Year: 2019).*
Byung Ok Kang et.al, "Speech Recognition for Task Domains with Sparse Matched Training Data", Applied sciences, Sep. 2020.
Chin-Cheng Hsu et al., "Voice Conversion from Unaligned Corpora using Variational Autoencoding Wasserstein Generative Adversarial Networks"., Interspeech, Apr. 2017.
Marc'Aurelio Ranzato et.al, "Semi-supervised Learning of Compact Document Representations with Deep Networks", International Conference on Machine Learning (ICML), Jul. 2008.
Wei-Ning Hsu et al., "Unsupervised learning of disentangled and interpretable representations from sequential data"., Neural Information Processing Systems, Sep. 22, 2017.

* cited by examiner

| Algorithm |
| --- |
| $\theta, \Phi \leftarrow$ After pre-Train |
| $\Psi \quad \leftarrow$ Initialize |
| while not converged do |
| $\quad X_t \quad \leftarrow$ mini-batch from target domain |
| $\quad X_g \quad \leftarrow$ mini-batch from general domain |
| $\quad X'_t, Z^t_1, Z^t_2 \leftarrow d\text{VAE}(X_t)$ |
| $\quad X'_g, Z^g_1, Z^g_2 \leftarrow d\text{VAE}(X_g)$ |
| $\quad X'_{t\backslash g} \leftarrow G_\theta(Z^g_1, Z^t_2)$ |
| $\quad L_{dec} \leftarrow L_{dec}(X_t) + L_{dec}(X_g)$ |
| $\quad L_{enc} \leftarrow L_{enc}(X_t) + L_{enc}(X_g)$ |
| $\quad L_{disc} \leftarrow L_{disc}(X_t, X_g)$ |
| $\quad \Phi \xleftarrow{\text{update}} -\nabla_\Phi(L_{enc} + L_{dec(gen)})$ |
| $\quad \theta \xleftarrow{\text{update}} -\nabla_\theta(L_{gen(dec)} + \alpha L_{disc})$ |
| $\quad \Psi \xleftarrow{\text{update}} -\nabla_\Psi(-L_{disc})$ |

METHOD AND APPARATUS FOR DATA AUGMENTATION

CROSS REFERENCE TO RELATED APPLICATION

This application claims the benefit of Korean Patent Application No. 10-2021-0088496, filed Jul. 6, 2021, which is hereby incorporated by reference in its entirety into this application.

BACKGROUND OF THE INVENTION

1. Technical Field

The present invention relates generally to sparse-data augmentation technology through end-to-end learning for attribute disentanglement-generation.

More particularly, the present invention relates to sparse-data augmentation technology based on substitution of latent variables of sparse data and general data.

2. Description of the Related Art

These days, continually advanced speech recognition technology is being applied to various fields, and service based thereon is being provided.

An acoustic model used for a speech recognition service is expected to exhibit optimal performance when the acoustic model is generated by being trained using a large amount of data matching the phonetic characteristics of a speaker using the service and noise and channel environments.

However, according to the speech recognition service, there may be limitations on collection of a large amount of speech data. For example, in the case of non-native speech recognition, it is difficult to collect a large amount of speech data for the corresponding service due to the limited number of non-native speakers compared to native speakers, and in the case of call-center recording speech recognition, there may be limitations on collection of a large amount of speech data due to problems related to personal information security.

The present invention is for a speech recognition service in which it is difficult to collect a large amount of data matching the phonetic characteristics of a speaker using the service and noise and channel environments, as in the above-described cases, and relates to a method for augmenting training data matching the acoustic characteristics of the service and noise and channel environments by using speech data in a domain in which a large amount of speech data can be acquired.

[Documents of Related Art]

(Patent Document 1) Korean Patent Application Publication No. 10-2019-0106861, titled "Artificial Intelligence apparatus for generating training data, Artificial Intelligence server, and method for the same".

SUMMARY OF THE INVENTION

An object of the present invention is to generate data in a sparse data domain, in which it is difficult to collect speech data, through end-to-end learning for attribute disentanglement-generation.

Another object of the present invention is to improve the performance of speech recognition through data augmentation for a service in which it is difficult to collect a large amount of speech data.

In order to accomplish the above objects, a method for data augmentation according to an embodiment of the present invention includes pretraining latent variables using first data corresponding to target speech and second data corresponding to general speech, training data augmentation parameters by receiving the first data and the second data as input, and augmenting target data using the first data and the second data through the pretrained latent variables and the trained parameters.

Here, pretraining the latent variables may include inferring, by the encoder of a variational autoencoder, latent variables using the first data and the second data and performing, by the decoder of the variational autoencoder, training so as to generate input data by receiving the latent variables as input.

Here, the latent variables may include a first latent variable corresponding to content attributes of speech data and a second latent variable corresponding to environment information of speech data.

Here, training the data augmentation parameters may comprise performing training using a structure in which a generative adversarial network is added to the variational autoencoder.

Here, training the data augmentation parameters may include generating first output through the variational autoencoder by receiving the first data as input, generating second output through the decoder by receiving the second latent variable corresponding to the first data and the first latent variable corresponding to the second data, and differentiating, by a discriminator, the first output and the second output from each other.

Here, augmenting the target data may comprise augmenting the target data through the decoder by receiving the second latent variable corresponding to the first data and the first latent variable corresponding to the second data.

Here, training the data augmentation parameters may comprise training the parameters using a first loss function corresponding to the encoder, a second loss function corresponding to the decoder, and a third loss function corresponding to the discriminator.

Here, the parameters may include a first parameter corresponding to the encoder, a second parameter corresponding to the decoder, and a third parameter corresponding to the discriminator.

Here, the environment information of the speech data may include information about at least one of a channel, noise, an accent, a tone, a rhythm, and a speech tempo of a speaker.

Also, in order to accomplish the above objects, an apparatus for data augmentation according to an embodiment of the present invention includes one or more processors and executable memory for storing at least one program executed by the one or more processors. The at least one program may pretrain latent variables using first data corresponding to target speech and second data corresponding to general speech, train data augmentation parameters by receiving the first data and the second data as input, and augment target data using the first data and the second data through the pretrained latent variables and the trained parameters.

Here, the at least one program may perform training such that the encoder of a variational autoencoder infers latent variables using the first data and the second data and such that the decoder of the variational autoencoder generates input data by receiving the latent variables as input.

Here, the latent variables may include a first latent variable corresponding to content attributes of speech data and a second latent variable corresponding to environment information of speech data.

Here, the at least one program may train the parameters using a structure in which a generative adversarial network is added to the variational autoencoder.

Here, the at least one program may train the parameters by generating first output through the variational autoencoder receiving the first data as input, generating second output through the decoder receiving the second latent variable corresponding to the first data and the first latent variable corresponding to the second data, and making a discriminator differentiate between the first output and the second output.

Here, the at least one program may augment the target data through the decoder by receiving the second latent variable corresponding to the first data and the first latent variable corresponding to the second data as input.

Here, the at least one program may train the parameters using a first loss function corresponding to the encoder, a second loss function corresponding to the decoder, and a third loss function corresponding to the discriminator.

Here, the parameters may include a first parameter corresponding to the encoder, a second parameter corresponding to the decoder, and a third parameter corresponding to the discriminator.

Here, the environment information of the speech data may include information about at least one of a channel, noise, an accent, a tone, a rhythm, and a speech tempo of a speaker.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
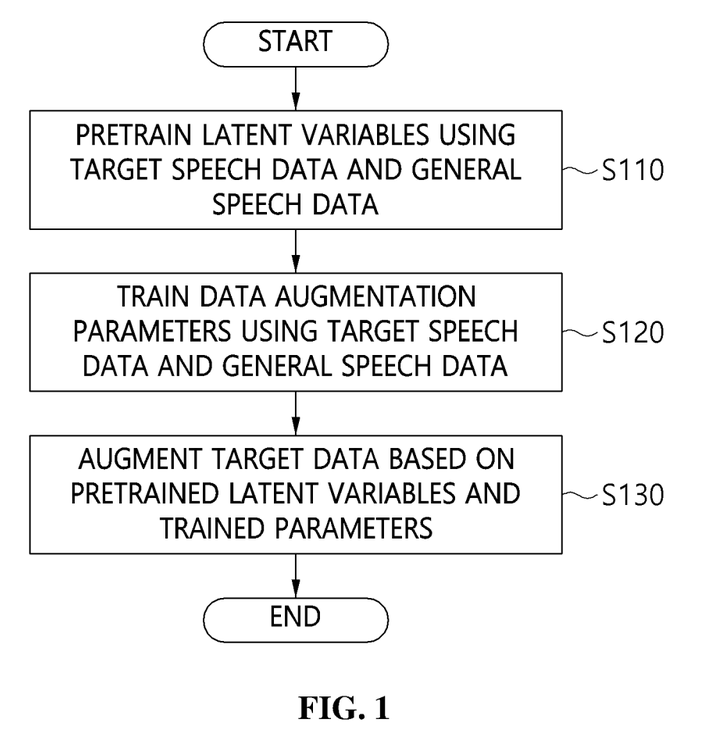
FIG. 1 is a flowchart illustrating a method for data augmentation according to an embodiment of the present invention.

FIG. 1 is a flowchart illustrating a method for data augmentation according to an embodiment of the present invention.

Referring to FIG. 1, in the method for data augmentation for a sparse data domain, performed by a data augmentation apparatus, pretraining for latent variables is performed using target speech data and general speech data at step S110.

Here, pretraining for the latent variables at step S110 may be performed using a Variational Auto-Encoder (VAE) structure.

The VAE is a generative model, and a generative model is a model that generates new data using a value that is sampled in the same distribution as the actual distribution of training data when the training data is given.

Here, pretraining for the latent variables at step S110 may include a step in which the encoder of the VAE receives first data corresponding to target speech data and second data corresponding to general speech and infers latent variables and a step in which the decoder of the VAE receives the latent variables and performs training so as to generate data similar to the input data.

Here, the latent variables may include a first latent variable corresponding to utterance content attributes of speech data and a second latent variable corresponding to an utterance environment and specific information pertaining to a speaker.

More specifically, there may be attributes corresponding to the entire duration of the corresponding utterance, such as channel and noise environments and the characteristics of a speaker, and attributes corresponding to a short duration, which change over time during a corresponding utterance, such as a phone sequence. The latent variables may be inferred such that these attributes are disentangled.

Subsequently, data augmentation parameters are trained at step S120 using the first data and the second data.

Here, training the data augmentation parameters at step S120 may be performed using a structure in which a generative adversarial network is added to the VAE.

Specifically, first output is generated using the VAE based on the pretraining result by receiving the first data, second output is generated using the latent variables corresponding to content, among the latent variables of the second data, and using the latent variables corresponding to environment information, among the latent variables of the first data, and a discriminator may be trained to differentiate between the first output and the second output.

A generative adversarial network is an Artificial Intelligence (AI) algorithm used for unsupervised learning, and may be implemented using two neural network systems that compete with each other in a zero-sum game. That is, a generator and a discriminator compete with each other, and training is performed so that each improves the performance of the other.

Here, according to the characteristics of the generative adversarial network, the generator is trained so as to generate second output similarly to the first output, and the discriminator is trained so as to more clearly differentiate between the first output and the second output.

Here, training the parameters may be performed using a first loss function corresponding to the encoder of the VAE, a second loss function corresponding to the decoder of the VAE, and a third loss function corresponding to the discriminator.

That is, the differential value of the parameters is calculated based on the values of the first to third loss functions, and the process of updating the parameters is repeated, whereby training may be performed.

Here, a stochastic gradient descent algorithm may be used for the process of updating the parameters, and various other algorithms for updating the parameters may be used.

Here, the parameters may include a first parameter corresponding to the encoder of the VAE, a second parameter corresponding to the decoder of the VAE, and a third parameter corresponding to the discriminator.

Subsequently, target data is augmented at step S130 using the first data and the second data based on the pretraining and training results.

That is, target data is augmented using the VAE structure that goes through the pretraining and training steps.

Here, augmenting the target data at step S130 may comprise augmenting the target data using the latent variable corresponding to environment information in the target data and the latent variable corresponding to content attributes in general data.

Here, the environment information may include information such as an accent, a tone, a rhythm, a speech tempo, and the like.

Data is generated as described above, whereby a large amount of target data for training, which is difficult to collect, may be generated.

Figure 2:
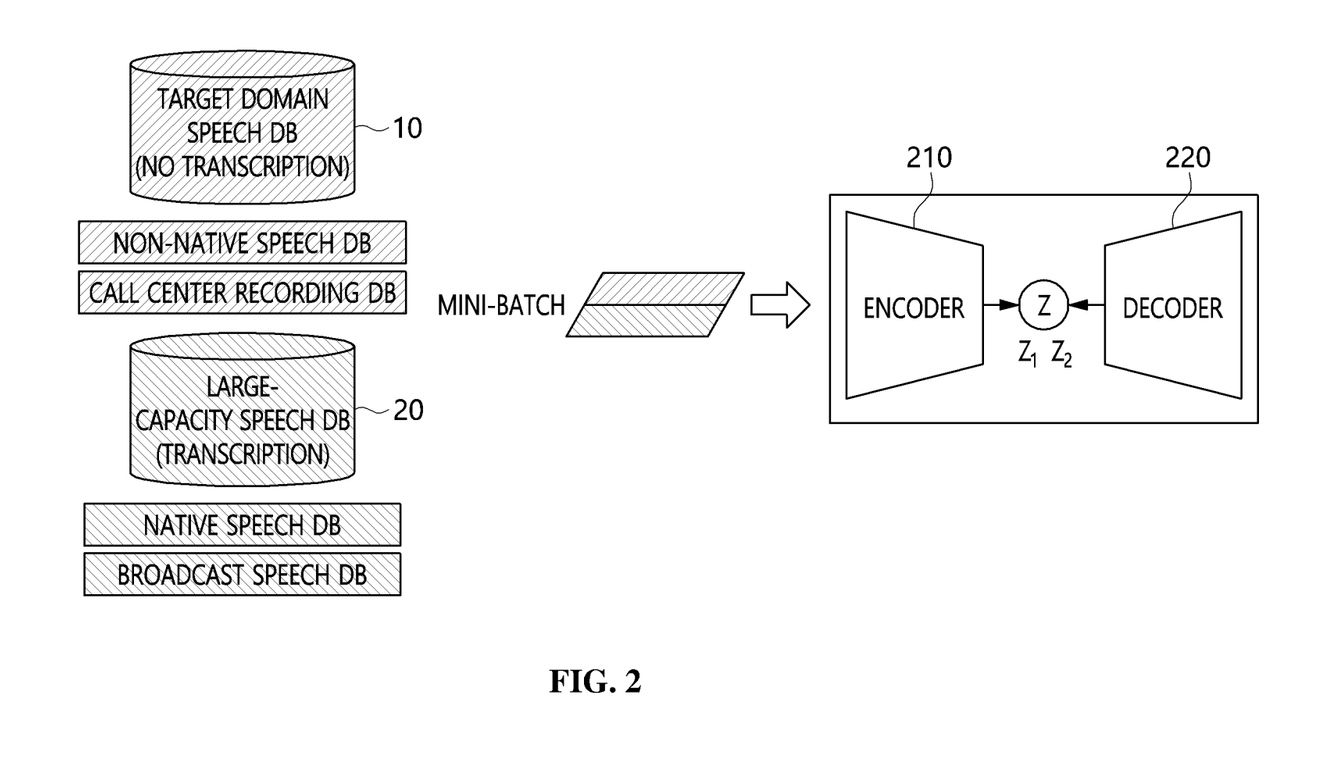
FIG. 2 is a view conceptually illustrating a pretraining step in a method for data augmentation according to an embodiment of the present invention.

FIG. 2 is a view conceptually illustrating a pretraining step in a method for data augmentation according to an embodiment of the present invention.

FIG. 2 illustrates a pretraining step in the method for augmenting data in a sparse data domain using a variational autoencoder (VAE) structure.

A target domain speech DB 10 of a target task, such as a non-native speech DB and a call center recording DB, and a large-capacity speech DB 20 of a general domain, such as a native speech DB and a broadcast speech DB, are input to the VAE, and latent variables having disentangled attributes may be learned.

Here, a single mini-batch is formed by sampling data respectively from the target domain speech DB 10 of the target task and the large-capacity speech DB 20 of the general domain, and training may be performed.

The VAE is a generative model, and a generative model is a model that generates new data using a value that is sampled in the same distribution as the actual distribution of training data when the training data is given.

Here, the attributes may include attributes pertaining to the entire duration of the corresponding utterance, such as channel and noise environments and the characteristics of a speaker, and attributes pertaining to a short duration, which change over time during the corresponding utterance, such as a phone sequence.

The latent variable output from the encoder 210 of the VAE may be configured as the addition of $Z_2$, which is a latent variable dependent on the entire duration of the corresponding utterance, and $Z_1$, which is a latent variable for modeling a residual attribute having dependence based on which the corresponding utterance and another utterance are not differentiated.

The encoder 210 infers the latent variables $Z_1$ and $Z_2$, the attributes of which are disentangled. Then, training is performed such that the decoder 220 receiving the latent variables $Z_1+Z_2$ having the disentangled attributes generates the original input speech, whereby the latent variables having the disentangled attributes may be learned using an unsupervised learning method based on large amounts of speech data.

Figure 3:
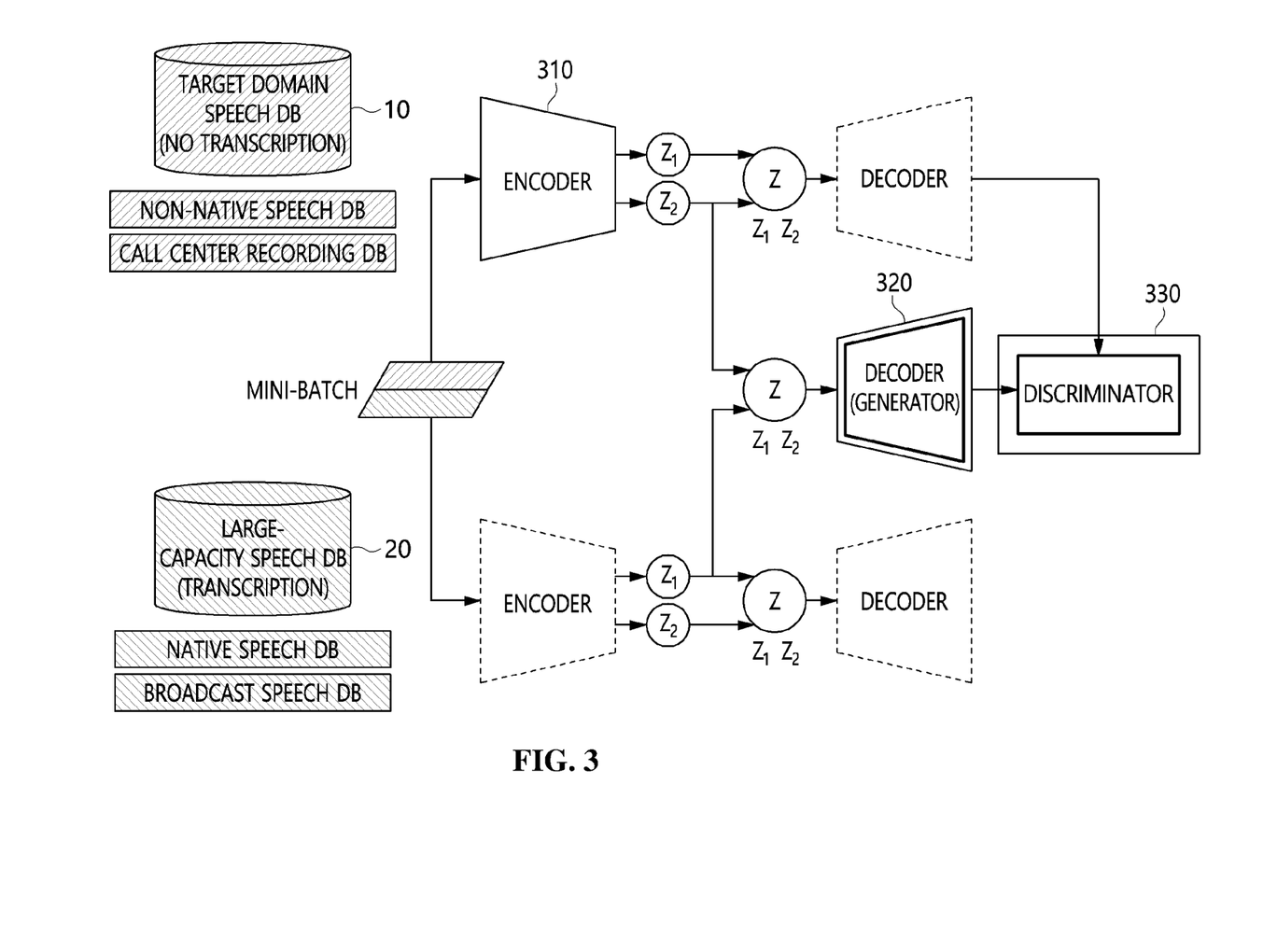
FIG. 3 is a view conceptually illustrating a training step in a method for data augmentation according to an embodiment of the present invention.

FIG. 3 is a view conceptually illustrating a training step of a method for data augmentation according to an embodiment of the present invention.

FIG. 3 illustrates the training step in the method for augmenting data in a sparse data domain using end-to-end learning for attribute disentanglement-generation.

The structure illustrated in FIG. 3 is formed by adding a generative adversarial network to a variational autoencoder (VAE) structure for generating latent variables.

That is, the decoder 320 of the VAE functions as the generator of the generative adversarial network, and a discriminator is added to the structure.

In the network structure in FIG. 3, the discriminator 330 functions to differentiate between a speech signal generated by the VAE to which the target domain speech DB 10 of the target task is input and a speech signal augmented by the generator to which the latent variables $Z_1+Z_2$ having the disentangled attributes are input. Here, the latent variables $Z_1+Z_2$ having the disentangled attributes are acquired through substitution with the content attribute $Z_1$ of the general domain speech DB 20 and the environment and speaker attributes $Z_2$ of the target domain speech DB, which are to be described later with reference to FIG. 4.

The loss function of the generative adversarial network in which the decoder 320 of the VAE structure functions as a generator and in which the discriminator 330 is added is as shown in Equation (1) below.

$$\mathcal{L}_{disc}(X_t, X_g) = \mathbb{E}_{X_t}[D_\psi(X_t)] - \mathbb{E}_{X'_{t|g}}[D_\psi(G_\theta(Z_1^g, Z_2^t))] \qquad (1)$$

Here, $X_t$ is data of the target domain speech DB 10 of the target task, and $X_g$ is data of the large-capacity speech DB 20 of the general domain.

Figure 4:
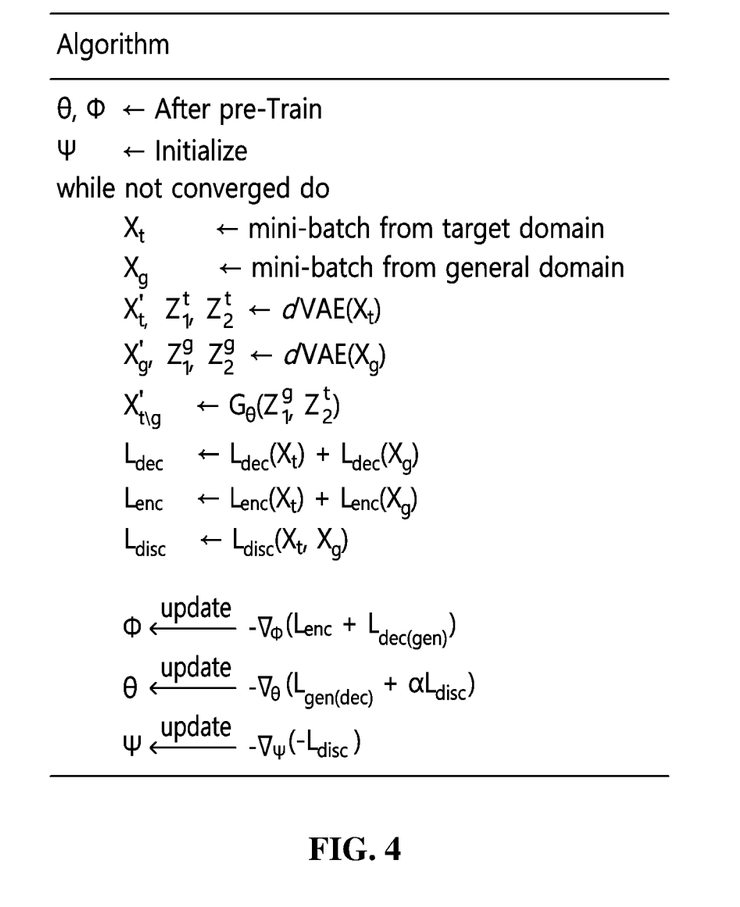
FIG. 4 is pseudocode illustrating a training process of the present invention.

FIG. 4 is pseudocode illustrating the overall process of the training step of the present invention.

Referring to FIG. 4, θ and φ are the parameters of a variational autoencoder (VAE) for disentangling attributes, which are trained in the pretraining step illustrated in FIG. 1, and ψ is the initial value of a discriminator.

$X_t$, which is the target domain speech DB of the target task, and $X_g$, which is the large-capacity speech DB of the general domain, are sampled separately and constitute a single mini-batch, and training is performed.

$X_t'$, $Z_1^t$, and $Z_2^t$, and $X_g'$, $Z_1^g$, and $Z_2^g$ are latent variables having disentangled attributes and generated signals acquired from an attribute-disentanglement variational autoencoder dVAE to which $X_t$ and $X_g$ are respectively input.

Subsequently, the values of the loss functions of the encoder, the decoder, and the discriminator are calculated by receiving $X_t$ and $X_g$ as input, and the parameters of the respective component systems are updated using the last three equations in FIG. 4.

Here, a stochastic gradient descent algorithm may be used for the process of updating the parameters of the system, and various other algorithms for updating the parameters may be used.

Figure 5:
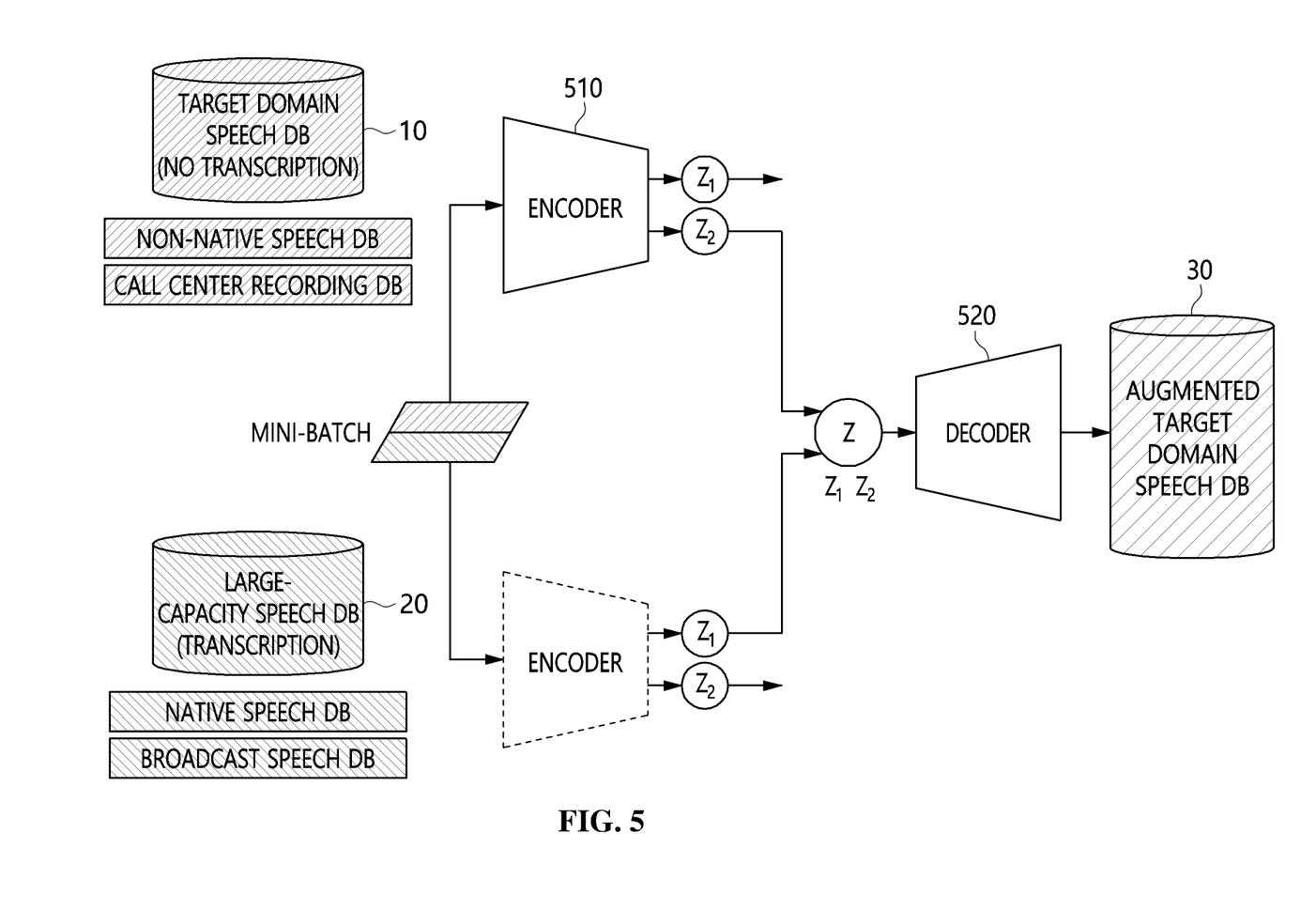
FIG. 5 is a view conceptually illustrating a data augmentation step in a method for data augmentation according to an embodiment of the present invention.

FIG. 5 is a view conceptually illustrating a data augmentation step in a method for data augmentation according to an embodiment of the present invention.

Referring to FIG. 5, the attributes of speech are substituted and combined using the VAE for attribute disentanglement, which is trained using the structures illustrated in FIGS. 2 and 3, whereby data is augmented.

The latent variables $Z_1+Z_2$, which are acquired using transcription information by maintaining content attributes configured with the phone sequence of refined speech corpus acquirable in large quantities, and which are acquired by substituting other attributes from speech data in a sparse data domain matching the target task, are input to the decoder, whereby training speech data of the target task may be significantly augmented.

Here, the attributes excluding the content attributes may include environment information, such as a channel and ambient noise, and distinct phonation information of a speaker using the corresponding service, such as an accent, a tone, a rhythm, a speech tempo, and the like.

That is, using the encoder 510 of the VAE, which goes through the pretraining and training steps, data of the target domain speech DB 10 and data of the large-capacity speech DB 20 are input, and latent variables corresponding to the respective types of data are output.

Subsequently, data is generated using the decoder 520 of the VAE, which goes through the pretraining and training steps, and the data may be stored in an augmented target domain speech DB 30.

Here, the decoder of the VAE may augment data using the latent variable $Z_2$ generated based on the data of the target domain speech DB 10 and the latent variable $Z_1$ generated based on the data of the large-capacity speech DB 20.

Figure 6:
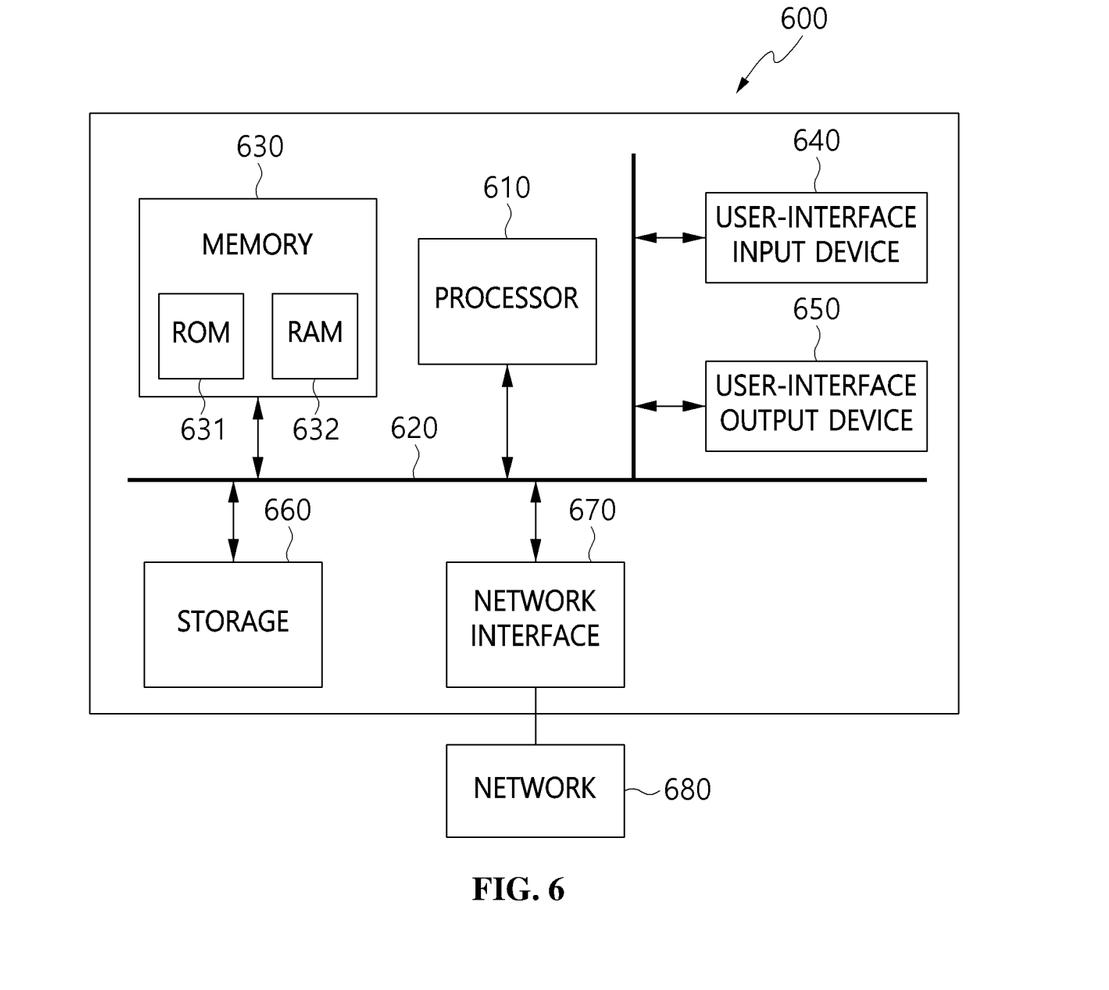
FIG. 6 is a view illustrating the configuration of a computer system according to an embodiment.

FIG. 6 is a view illustrating the configuration of a computer system according to an embodiment.

The apparatus for data augmentation according to an embodiment may be implemented in a computer system 600 including a computer-readable recording medium.

The computer system 600 may include one or more processors 610, memory 630, a user-interface input device 640, a user-interface output device 650, and storage 660, which communicate with each other via a bus 620. Also, the computer system 600 may further include a network interface 670 connected to a network 680. The processor 610 may be a central processing unit or a semiconductor device for executing a program or processing instructions stored in the memory 630 or the storage 660. The memory 630 and the storage 660 may be storage media including at least one of a volatile medium, a nonvolatile medium, a detachable medium, a non-detachable medium, a communication medium, and an information delivery medium. For example, the memory 630 may include ROM 631 or RAM 632.

The apparatus for data augmentation according to an embodiment of the present invention includes one or more processors and executable memory for storing at least one program executed by the one or more processors, and the at least one program may pretrain latent variables using first data corresponding to target speech and second data corresponding to general speech, train data augmentation parameters by receiving the first data and the second data as input, and augment target data using the first data and the second data through the pretrained latent variables and the trained parameters.

Here, the at least one program may perform training such that the encoder of a variational autoencoder infers the latent variables using the first data and the second data and such that the decoder of the variational autoencoder receives the latent variables and generates input data.

The variational autoencoder is a generative model, and the generative model is a model that generates new data using a value that is sampled in the same distribution as the actual distribution of training data when the training data is given.

Here, the latent variables may include a first latent variable corresponding to content attributes of speech and a second latent variable corresponding to environment information of speech.

Here, the at least one program may train the data augmentation parameters using a structure in which a generative adversarial network is added to the variational autoencoder.

Here, the at least one program may generate first output through the variational autoencoder by receiving the first data, generate second output through the decoder by receiving the second latent variable corresponding to the first data and the first latent variable corresponding to the second data, and train the data augmentation parameters by making a discriminator differentiate between the first output and the second output.

Here, the at least one program may train the data augmentation parameters using a first loss function corresponding to the encoder, a second loss function corresponding to the decoder, and a third loss function corresponding to the discriminator.

Here, the at least one program may update the parameters based on the values of the first to third loss functions.

Here, a stochastic gradient descent algorithm may be used for the process of updating the parameters, and various other algorithms for updating the parameters may be used.

Here, the parameters may include a first parameter corresponding to the encoder, a second parameter corresponding to the decoder, and a third parameter corresponding to the discriminator.

According to the present invention, data of a sparse data domain, in which it is difficult to collect speech data, may be generated through end-to-end learning for attribute disentanglement-generation.

Also, according to the present invention, the performance of speech recognition may be improved through data augmentation for a service in which it is difficult to collect a large amount of speech data.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for data augmentation by an apparatus, the apparatus including a processor and a memory operably coupled to the processor, wherein the memory stores program instructions to be executed by the processor, the method comprising:
   pretraining latent variables using first data corresponding to target speech and second data corresponding to general speech;
   training data augmentation parameters by receiving the first data and the second data as input; and
   augmenting target data using the first data and the second data through the pretrained latent variables and the trained parameters,
   wherein the latent variables include
   a first latent variable corresponding to content attributes including a phone sequence of refined speech corpus of speech data; and
   a second latent variable corresponding to environment information of speech data,
   wherein the environment information of the speech data includes information about at least one of a channel, noise, an accent, a tone, a rhythm, and a speech tempo of a speaker.

2. The method of claim 1, wherein pretraining the latent variables includes
   inferring, by an encoder of a variational autoencoder, latent variables using the first data and the second data; and
   performing, by a decoder of the variational autoencoder, training so as to generate input data by receiving the latent variables as input, and
   wherein training the data augmentation parameters comprises performing training using a structure in which a generative adversarial network is added to the variational autoencoder.

3. The method of claim 2, wherein training the data augmentation parameters includes
   generating first output through the variational autoencoder by receiving the first data as input;
   generating second output through the decoder by receiving the second latent variable corresponding to the first data and the first latent variable corresponding to the second data; and
   differentiating, by a discriminator, the first output and the second output from each other.

4. The method of claim 3, wherein augmenting the target data comprises augmenting the target data through the decoder by receiving the second latent variable corresponding to the first data and the first latent variable corresponding to the second data.

5. The method of claim 4, wherein training the data augmentation parameters comprises training the parameters using a first loss function corresponding to the encoder, a second loss function corresponding to the decoder, and a third loss function corresponding to the discriminator.

6. The method of claim 5, wherein the parameters include a first parameter corresponding to the encoder, a second parameter corresponding to the decoder, and a third parameter corresponding to the discriminator.

7. An apparatus for data augmentation, comprising:
   one or more processors; and
   executable memory for storing at least one program executed by the one or more processors,
   wherein the at least one program is configured to
   pretrain latent variables using first data corresponding to target speech and second data corresponding to general speech;
   train data augmentation parameters by receiving the first data and the second data as input; and
   augment target data using the first data and the second data through the pretrained latent variables and the trained parameters,
   wherein the latent variables include
   a first latent variable corresponding to content attributes including a phone sequence of refined speech corpus of speech data; and
   a second latent variable corresponding to environment information of speech data,
   wherein the environment information of the speech data includes information about at least one of a channel, noise, an accent, a tone, a rhythm, and a speech tempo of a speaker.

8. The apparatus of claim 7, wherein the at least one program performs training such that an encoder of a variational autoencoder infers latent variables using the first data and the second data and such that a decoder of the variational autoencoder generates input data by receiving the latent variables as input, and
   wherein the at least one program trains the parameters using a structure in which a generative adversarial network is added to the variational autoencoder.

9. The apparatus of claim 8, wherein the at least one program trains the parameters by generating first output through the variational autoencoder receiving the first data as input, generating second output through the decoder receiving the second latent variable corresponding to the first data and the first latent variable corresponding to the second data, and making a discriminator differentiate between the first output and the second output.

10. The apparatus of claim 9, wherein the at least one program augments the target data through the decoder by receiving the second latent variable corresponding to the first data and the first latent variable corresponding to the second data as input.

11. The apparatus of claim 10, wherein the at least one program trains the parameters using a first loss function corresponding to the encoder, a second loss function corresponding to the decoder, and a third loss function corresponding to the discriminator.

12. The apparatus of claim 11, wherein the parameters include a first parameter corresponding to the encoder, a second parameter corresponding to the decoder, and a third parameter corresponding to the discriminator.

* * * * *